(12) United States Patent  
Specht et al.

(10) Patent No.: US 10,730,458 B2  
(45) Date of Patent: Aug. 4, 2020

(54) ELECTRICAL ENERGY SUPPLY SYSTEM AND PRODUCTION METHOD FOR THE SAME

(71) Applicant: Lisa Draexlmaier GmbH, Vilsbiburg (DE)

(72) Inventors: Klaus Specht, Geisenhausen (DE); Michael Wortberg, Dorfen (DE)

(73) Assignee: Lisa Draexlmaier GmbH, Vilsbiburg (DE)

( * ) Notice: Subject to any disclaimer, the term of this patent is extended or adjusted under 35 U.S.C. 154(b) by 0 days.

(21) Appl. No.: 15/952,269

(22) Filed: Apr. 13, 2018

(65) Prior Publication Data

US 2018/0229677 A1    Aug. 16, 2018

Related U.S. Application Data

(63) Continuation of application No. PCT/EP2016/074450, filed on Oct. 12, 2016.

(30) Foreign Application Priority Data

Oct. 15, 2015   (DE) .......................... 10 2015 220 115

(51) Int. Cl.  
*H02B 1/20* (2006.01)  
*B60R 16/03* (2006.01)  
(Continued)

(52) U.S. Cl.  
CPC ................ *B60R 16/03* (2013.01); *B60L 1/00* (2013.01); *B60R 16/0207* (2013.01);  
(Continued)

(58) Field of Classification Search  
CPC . B60R 16/03; B60R 16/0238; B60R 16/0215; B60R 16/0217; B60L 1/00; B62D 21/17; H01R 11/01; H01R 4/029  
(Continued)

(56) References Cited

U.S. PATENT DOCUMENTS 3,179,904 A * 4/1965 Paulsen .................... H01B 7/08  
                                                              174/117 R  
5,946,176 A * 8/1999 Ghoshal ............. H01H 59/0009  
                                                              29/622  
(Continued)

FOREIGN PATENT DOCUMENTS

DE      102012215403       3/2014  
DE      102013101801       8/2014  
(Continued)

OTHER PUBLICATIONS

International Search Report for PCT/EP2016/074450, dated Feb. 1, 2017.

*Primary Examiner* — Hung S. Bui  
(74) *Attorney, Agent, or Firm* — Burris Law, PLLC

(57) ABSTRACT

An electrical energy supply system for a vehicle includes at least one ground conductor configured as a flat conductor rail arranged on a floor assembly of a body in white of the vehicle. At least one supply line inserted into the body in white is included and the at least one supply line is guided, at least one section of the body in white, parallel to and along the at least one ground conductor such that the at least one supply line at least partially overlaps a flat side of the at least one ground conductor. The body in white is made from a metallic material, the at least one supply line is positioned a predetermined distance from the at least one ground conductor, and the predetermined distance is a function of an electromagnetic field resulting from a current flowing through the at least one supply line.

18 Claims, 9 Drawing Sheets

(51) Int. Cl.
   *B60L 1/00* (2006.01)
   *B60R 16/02* (2006.01)
   *B62D 21/17* (2006.01)
   *B60R 16/023* (2006.01)
   *H01R 11/01* (2006.01)
   *H01R 4/02* (2006.01)
   *H01R 4/28* (2006.01)

(52) U.S. Cl.
   CPC ...... *B60R 16/0215* (2013.01); *B60R 16/0238* (2013.01); *B62D 21/17* (2013.01); *H01R 11/01* (2013.01); *H01R 4/029* (2013.01); *H01R 4/28* (2013.01)

(58) Field of Classification Search
   USPC ........................................................ 361/826
   See application file for complete search history.

(56) References Cited

U.S. PATENT DOCUMENTS

| | | | |
|---|---|---|---|
| 6,971,650 B2 | 12/2005 | Marelja | |
| 8,008,589 B2 * | 8/2011 | Grundmeier | B60Q 1/1469 200/305 |
| 8,053,898 B2 * | 11/2011 | Marcoux | H01L 23/481 257/173 |
| 9,452,790 B2 | 9/2016 | Peitz | |
| 9,466,599 B2 * | 10/2016 | Nair | H01L 27/0266 |
| 2004/0232725 A1 | 11/2004 | Marelja | |
| 2007/0095552 A1 * | 5/2007 | Thierolf | H01B 7/0861 174/36 |
| 2010/0294531 A1 | 11/2010 | Wefers et al. | |
| 2011/0088944 A1 * | 4/2011 | Ogue | B60R 16/0215 174/72 A |
| 2012/0305308 A1 * | 12/2012 | Toyama | B60R 16/0207 174/70 R |
| 2013/0092434 A1 * | 4/2013 | Kato | B60R 16/0215 174/72 A |
| 2018/0201208 A1 * | 7/2018 | Wortberg | B60R 16/0238 |
| 2019/0061650 A1 * | 2/2019 | Kato | B60R 16/0215 |
| 2019/0082537 A1 * | 3/2019 | Ozaki | H05K 1/144 |
| 2019/0126860 A1 * | 5/2019 | Takamatsu | B60R 16/0207 |

FOREIGN PATENT DOCUMENTS

| | | | |
|---|---|---|---|
| DE | 102014005001 | | 10/2015 |
| DE | 102014218776 | | 3/2016 |
| JP | 10-42423 | * | 2/1998 |
| WO | 2008/151855 | | 12/2008 |

* cited by examiner

ELECTRICAL ENERGY SUPPLY SYSTEM AND PRODUCTION METHOD FOR THE SAME

CROSS-REFERENCE TO RELATED APPLICATIONS

This application is a continuation of International Application No. PCT/EP2016/074450, filed on Oct. 12, 2016, which claims the benefit of DE 10 2015 220 115.5, filed on Oct. 15, 2015. The disclosures of the above applications are incorporated herein by reference.

FIELD

The present disclosure relates an electrical energy supply system, in particular an onboard electrical system, for a vehicle, such as a motor vehicle, hybrid vehicle or electric vehicle. The energy supply system is suitable especially for supplying power to electrical loads arranged in a distributed manner in the vehicle. The present disclosure furthermore relates to a method for producing and/or providing an electrical energy supply system of this kind for a vehicle.

BACKGROUND

The statements in this section merely provide background information related to the present disclosure and may not constitute prior art.

Energy supply systems of different designs for supplying power to electrical loads of a vehicle are already known from practical experience in vehicle engineering. Often, the electrical loads arranged in a distributed manner in the vehicle are supplied by means of a multiplicity of individual electrical leads, which are bundled into a set of leads and, starting from a generator, a vehicle battery and/or a power distributor, are routed through the vehicle to the loads. During vehicle production, these leads are laid at the rather late stage in the installation space that then remains in the vehicle, e.g. in sills, cavities or niches. Here, the ground return from the loads to the electrical negative terminal of the vehicle battery is accomplished via the electrically conductive body of the vehicle, from which a ground conductor is passed to the negative terminal of the vehicle battery.

For the sake of lightweight construction of a body, however, use is also made of different material combinations, which are often not suitable for ground return via the body manufactured therefrom, owing to the low electrical conductivity and/or the joining technique between the individual materials thereof. This is because the ground return current always follows the path of least electrical resistance, but it is not possible to predetermine this clearly in the case of different material combinations and various joining techniques. Moreover, it has been found that the ground return current is also dependent on its frequency, higher frequencies bringing about a ground return current which is particularly difficult to calculate. Owing to the undefined or undirected ground return current, electromagnetic fields which have a negative effect on the electromagnetic compatibility (EMC) of the vehicle can arise.

Another kind of ground return is known, for example, from the German patent application with the application number 102014005001.7, which is a later publication. This document contains a description of a ground return for a body made from a carbon-fiber-reinforced plastic (CFRP), which is electrically nonconductive or only slightly conductive. Owing to the poor electrical conductivity of the CFRP body, this prior art proposes to directly integrate a ground conductor designed as a flat conductor rail into the CFRP body by lamination into the CFRP material of which said body is made. Although this allows a ground return even in the case of a nonconductive body, there is a desire for a ground return which is simpler in design and/or in terms of manufacture.

SUMMARY

The present disclosure provides an easily installed ground return using means which are as simple as possible in design while simultaneously obtaining high electromagnetic compatibility.

An electrical energy supply system according to the present disclosure for a vehicle has at least one ground conductor, which has already been provided with a body in white of the vehicle, is designed as a flat conductor rail of relatively stable shape, in one form, made of aluminum or an aluminum alloy, and is in one form arranged on an underside or upper side of a floor assembly of the vehicle. In this context, a body in white should be taken to mean a frame, basic framework or skeleton of a vehicle without or, alternatively, with a chassis. The body in white and/or the floor assembly in one form comprises/comprise a metallic material or is produced completely from one or more, possibly different, metallic materials, e.g. a steel or a steel alloy. In addition, or as an alternative, the body in white can also comprise a carbon-fiber-reinforced plastic (CFRP). Depending on the variant of the present disclosure, the body in white can be painted with a vehicle paint even before the attachment of the ground conductor or can be (as yet) unpainted before the attachment thereof. Moreover, an underseal can be applied even before the attachment of the ground conductor or can be (not yet) applied before the attachment thereof. The floor assembly has either a single floor assembly segment or a plurality of interconnected floor assembly segments, which may then be produced from different materials and connected to one another.

In one form, the ground conductor is integrated into the body in white before body attachments, such as doors, windows or the like, are attached thereto in order to provide easy mounting of the ground conductor. The ground conductor can have laterally arranged electrical contact parts, e.g. contact studs or contact tabs, via which (e.g., flexible) ground lines electrically connected to the electrical loads can be brought into contact with the ground conductor. The ground conductor does not necessarily have to extend between a front region and a rear region of the vehicle but can also serve to partially bridge body or floor assembly segments which are electrically nonconductive or have only poor electrical conductivity. This bridging of nonconductive floor assembly segments can be performed both in the longitudinal direction and in the transverse direction of the vehicle. In the case of a vehicle which has a vehicle battery in the rear of the vehicle, however, it is advantageous if the ground conductor extends continuously from the front region to the rear region. The ground conductor can also have a plurality of individual flat conductor rails, which are arranged in a manner distributed over the body in white. These are either connected electrically to one another or serve merely to electrically bridge sections of the body in white which are electrically nonconductive or have only poor electrical conductivity.

According to the present disclosure, the energy supply system furthermore has at least one supply line as a currentcarrying potential line and/or at least one signal line, which is/are inserted into the vehicle after the provision of the body in white comprising a metallic material, which is then at least partially produced. The at least one supply line is guided, at least in some section or sections, at a distance predetermined according to an electromagnetic field brought about by the supply line through which current flows, parallel to the ground conductor and along the ground conductor in such a way that it at least partially overlaps with a flat side of the ground conductor.

An at least partially produced vehicle should be taken to mean that at least the ground conductor explained above has been attached to the body in white. However, it may also be that parts attached to the body have been attached to the body in white and/or that the body in white and the chassis have already been assembled. It is likewise possible that the vehicle has already been finished apart from the still-to-be-installed supply line, i.e. has been finished even in the interior. The distance dependent on the electromagnetic field can be predetermined, for example, by prior tests of the electromagnetic compatibility (EMC), whereby it is possible inter alia to determine the spatial extent of the electromagnetic field. The EMC can be determined inter alia by galvanic, capacitive or inductive measurement, wherein for this purpose measurements can be carried out on a test structure by means of coupling clamps or current coupling clamps, for example. The distance is predetermined in such a way that an electromagnetic field which forms when there is a flow or pulse of electric current through the supply line causes an induced current in the ground conductor which, as a result, generates an electromagnetic field which at least partially cancels out the opposite electromagnetic field of the supply line.

A (spatial) overlap should be taken to mean that the at least one supply line is arranged at least partially within a transverse extent of a flat side of the ground conductor. In the simplest case, the overlap is achieved by simply laying the at least one supply line on a flat side of the ground conductor, wherein the overlap amounts to approximately 100% of the cross section of the supply line if the contact is completely within the transverse extent. For improved usage of the installation space in the vehicle, the supply line and the ground conductor in one form overlap in the direction of a vertical axis of the vehicle, i.e. are arranged one on top of the other. It is also possible for a retaining clip for fixing the ground conductor and/or a vehicle component, such as a vehicle carpet, interior component or body element, to be arranged between the ground conductor and the supply line. For the sake of simplicity, the distance between the ground conductor and the supply line is defined as the distance between an outer surface of a flat side of the ground conductor and the outer surface of the supply line, that is to say, for example, an outer surface of a flat side or a peripheral surface of the supply line.

With this configuration, the energy supply system according to the present disclosure offers several advantages at once. Thus, by virtue of the decoupling of the ground conductor and the supply line, it can be dimensioned for different rated voltages in a manner which is simple in terms of design and can therefore be used for rated voltages of both about 12 V and 48 V and in the high voltage range, i.e. above 60 V, according to the specific case. Moreover, the body in white is readily accessible spatially in comparison with a vehicle that is further along in production, and therefore a flat conductor rail with a length of two, three or more meters as a ground conductor can be laid, installed and fastened with relatively little effort. By means of the ground conductor, a clearly predetermined ground return current through the vehicle can be defined, even in the case of different body materials, possibly of poor conductivity, and therefore the EMC properties can be improved simply by this measure. The decoupling of the ground conductor designed as a flat conductor rail from the supply line, which is in one form designed as a flexible conductor, improves ease of assembly and, at the same time, provides high functional reliability by virtue of good EMC properties. A shield additionally arranged around the supply conductor to reduce electromagnetic fields, as used in conventional energy supply systems, can therefore be eliminated.

A particularly advantageous development of the present disclosure envisages that the distance between the ground conductor and the supply line decoupled therefrom is no more than 15 mm, i.e. between direct contact with one another and 15 mm. This is because tests of the present disclosure have shown that electromagnetic fields of the supply line and of the ground conductor cancel each other out at least to a large extent within the 15 mm and therefore allow particularly good EMC properties of the vehicle.

In order to compensate for a change in the length of the body (in white), e.g. due to thermal expansion of a body material, or of the ground conductor, it is advantageous if the ground conductor is fastened to the body in white in such a way that a change in length between the ground conductor and the body in white can be compensated. This can be achieved, for example, by means of fixed/floating mounting, a combination of fastening at one end and guidance at the other end or a length-compensating adhesive bond. For example, the ground conductor can be welded in the longitudinal direction thereof to the body in white at one or more points. This weld can be arranged directly at electrical contact points for making contact with the supply line or, alternatively, at other points in the longitudinal direction of the ground conductor. In addition, or as an alternative, the ground conductor can also be adhesively bonded to the body in white. Adhesive bonding can be carried out in the form of spots, over partial areas in the longitudinal direction or over the full area. In the case of adhesive bonding over the full area, it is advantageous for mechanically determined fastening if the size, layer thickness and/or type of the adhesive is chosen in such a way that a length compensation between the body in white and the ground conductor can be accomplished by means of the adhesive layer. By means of the adhesive bonding, it is possible to damp vibrations transmitted to the ground conductor.

For integration of the energy supply system into the vehicle in a manner which is simple in terms of design, it is advantageous if the ground conductor is arranged substantially centrally on the body in white and extends there in the longitudinal direction of the body in white. In the case of central arrangement, the electrical connections between the electrical loads and the ground conductor can be kept relatively short, making it possible to integrate these ground lines in a simple manner. In this way, it is possible to achieve what is referred to as an (energy) backbone structure, which allows central, directly contactable power supply to the electrical loads. Moreover, the ground conductor can be laid along a propshaft tunnel, a tunnel-shaped raised portion of the body or a tunnel-shaped depression in the body of the vehicle, for example.

The ground conductor can be provided with particularly little outlay on assembly if the ground conductor is covered with a vehicle paint or an underseal. In this way, the ground conductor can be secured on the body in white while the latter is still being produced, and is then simply painted or covered with underseal together with the body. In this process, it is expedient if the electrical contact parts are masked by plugs or by screwing a nut onto a contact stud or the like, thus ensuring that electrically conductive contact parts are not painted at the same time. The vehicle paint advantageously serves simultaneously as electrical insulation for the ground conductor, similarly to the conventional ground return via the body.

In order also to allow geometrically or topologically more difficult laying paths of the ground conductor along the body, it is advantageous if the ground conductor is a stamped and/or bent part. Thus, the ground conductor can also be provided as a stamped/bent part comprising a metal sheet with an L-, T- or H-shaped geometry, for example, or comprising a plurality of interconnected individual parts, using methods that are simple in terms of production engineering. In this way, it is possible to provide a ground conductor which is matched geometrically to the shape of the body.

In order to be able to retain the cross section, despite lateral contacting of the ground conductor by contact studs attached to the body in white, for example, it is advantageous if the ground conductor has a width which varies along its length. For example, the ground conductor has a greater width at a point at which it makes contact with a contact stud or the like than where there is no contact stud to be contacted. In other words, the ground conductor has, in some section or sections, contact regions in which it has a greater width than in exclusively conducting regions.

For good EMC properties with, at the same time, good integration into the vehicle, it is advantageous if the ground conductor has a width of about 10 mm to about 60 mm, and in one form of about 30 mm to about 60 mm. It has been found that, with this width of the ground conductor, the EMC properties can be influenced in a favorable manner. A width of about 60 mm, in particular, has produced good EMC properties here.

In order to be able to transmit sufficiently high currents, it is advantageous if the ground conductor has a height of about 0.8 mm to about 5 mm, and in one form of about 1 mm to about 2 mm.

Irrespective of any vehicle paint or underseal applied, it is advantageous if the ground conductor has an insulating layer with a (layer) thickness of about 0.15 mm to 2.5 mm, and in one form of 0.3 mm to about 1.5 mm.

In order to improve the cold starting properties of the vehicle, at least one first supply line can be provided for the electrical connection of a starter to a battery of the vehicle, and at least one second supply line can be provided for the electrical connection of a vehicle battery positive to one or more electrical loads of the vehicle, e.g. for the purpose of supplying the vehicle interior. In particular, a starter-generator-battery supply rail can be provided as a first supply line and a battery-positive supply rail can be provided as a second supply line for the sake of mutual electrical decoupling. The ground conductor is routed in parallel, at least in some section or sections, at the predetermined distance from the two supply rails. In this way, it is possible to decouple a voltage drop during cold starting and a generator voltage characteristic with a negative effect on the EMC properties from one another. Ideally, the two supply lines and the ground conductor are arranged in three layers. Here, the ground conductor is connected to the floor assembly of the body in white, arranged above it is the starter-generator-battery supply line rail and, arranged above this, is the battery-positive supply conductor rail. Equally, the arrangement of the two supply rails relative to one another can be interchanged.

Another advantageous variant of the present disclosure envisages that the supply line is provided as a flat conductor rail, the contour of which is substantially matched to the contour of the ground conductor. This can be electrically insulated and can be composed of an aluminum or of an aluminum alloy. By decoupling the ground conductor and the supply line, the supply line, which is here provided as a flat conductor rail, can be laid relatively easily within the vehicle since, in particular, it is easier to bend.

In order to obtain improved EMC properties, it is advantageous if a flat side of the supply line extends parallel to the flat side of the ground conductor.

In an alternative variant of the present disclosure, the supply line is provided as one or more flexible lines, in particular as stranded conductors. "Flexible" should be taken to mean that the supply line is unstable in terms of shape or changeable in terms of shape. The supply line can also comprise a multiplicity of individual lines with different line cross sections, which may be combined into a set of lines (line strand).

For an increased overlap between the ground conductor and supply line, it is advantageous if the flexible line or lines, in particular stranded conductor/s, is/are arranged parallel to one another within the transverse extent of the ground conductor. This means that the individual lines are arranged adjacent to one another in a row, being arranged so as to lie next to one another.

Particularly in the case of high-frequency electric current, it is possible to achieve good EMC properties with the present disclosure even when the floor assembly is produced at least partially from an electrically conductive metallic material. This is because, although the metallic material would in principle be electrically conductive, the ground conductor locally defines an improved ground return in respect of EMC properties.

The present disclosure also relates to a method for producing an energy supply system for a vehicle, wherein all the above-explained features of the energy supply system can be produced by the method according to the present disclosure.

The method according to the present disclosure for producing an energy supply system for a vehicle provides at least the following steps:

Attaching a ground conductor designed as a flat conductor rail to a floor assembly of a body in white of the vehicle.

Providing the body in white or the at least partially produced vehicle together with the ground conductor integrated therein.

Arranging at least one supply line as a potential line, which is guided, at least in some section or sections, parallel to the ground conductor and along the ground conductor, at a distance predetermined according to an electromagnetic field brought about by the supply line through which current flows, in such a way that it at least partially overlaps with a flat side of the ground conductor.

Thus, the method according to the present disclosure and the energy supply system produced thereby allow easy installation in a vehicle and good EMC properties of the energy supply system.

The above-described properties, features and advantages of the present disclosure, as well as the manner in which they are achieved, will become clearer and more easily understood in the following schematic description of one form, and they are explained below in greater detail with reference to the drawings. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

Advantageous illustrative forms of the present disclosure are explained below with reference to the accompanying figures, of which.

Figure 1:
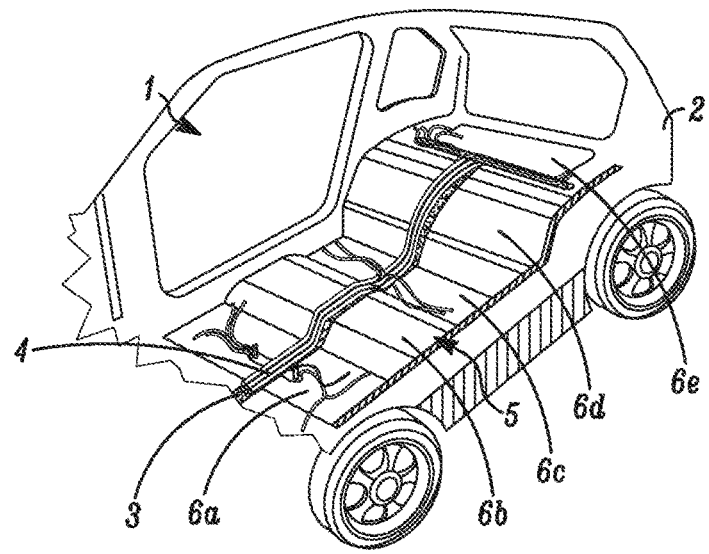
FIG. 1 shows a perspective cutaway view of a body in white of a vehicle having an energy supply system according to the present disclosure, comprising a ground conductor and a multiplicity of supply and/or signal lines.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The figures are merely schematic illustrations and are used only to explain the present disclosure. Identical or identically acting elements are provided with the same reference signs throughout.

FIG. 1 shows a basic principle of an electrical energy supply system 1 for a vehicle in a perspective side view. The energy supply system 1, which can also be referred to as an onboard (energy) system, is used to supply power to a multiplicity of electrical loads of the vehicle, which are arranged in a manner distributed over the vehicle. The energy supply system is electrically connected to a vehicle battery (not shown), namely via supply lines to the electrical positive terminal of said battery and via ground conductors to the negative terminal thereof. The power is supplied from the positive terminal to the electrical loads. From the loads supplied with power, there is a ground return back to the electrical negative terminal of the vehicle battery (not shown), arranged in the rear region of the vehicle, for example.

In this illustration, the energy supply system 1 is arranged on a body in white 2 of the vehicle constructed thereon and substantially comprises a ground conductor 3, already attached to the body in white 2, leading to the ground return and one or more supply and/or signal lines 4, which are arranged only afterwards and which are referred to jointly below as supply lines 4. It can be seen that a multiplicity of the supply lines 4 is routed parallel to the ground conductor 3 here, at least in some section or sections, while resting on a flat side of the ground conductor 3. At least some of the supply lines 4 are fastened to the ground conductor 3, namely, for example, by means of a strap, adhesive tape or winding tape, which is here designed as hook-and-loop tape.

The ground conductor 3, which is produced from aluminum or an aluminum alloy, rests centrally on top of a floor assembly 5 of the body in white 2 in the direction of the width of the body in white 2 and extends in the longitudinal direction thereof. That is to say that the ground conductor 3 faces a subsequent vehicle interior. In the illustration shown, some of the supply lines 4 arranged one above the other rest directly on the ground conductor 3, and therefore a distance d between the ground conductor 3 and these supply lines 4 is zero in this case. For the other supply lines 4, which do not rest directly on the ground conductor 3, the distance d from the ground conductor is also no more than 15 mm. With this distance d, good electromagnetic compatibility (EMC) is obtained since, at this distance, an electromagnetic field (not shown), which is produced when there is a flow of current or a current pulse within at least one of the supply lines 4, and another electromagnetic field, which results from an induced current within the ground conductor 3, cancel each other out at least to a large extent.

Figure 2:
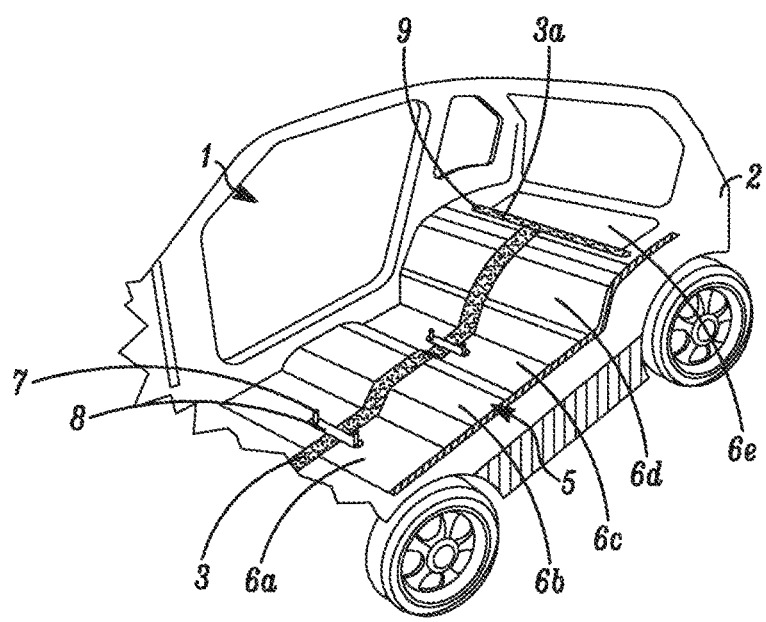
FIG. 2 shows a perspective cutaway view of the body in white from FIG. 1 having a ground conductor attached thereto, wherein the supply and/or signal lines have been omitted for the sake of better illustration.

In FIG. 2, which shows the body in white 2 in a perspective view, this time without the supply lines 4 for the sake of better illustration, it can be seen that the floor assembly 5 of the body in white 2 has a plurality of individual interconnected floor assembly segments 6a to 6e, over which the ground conductor 3 extends from a vehicle front, i.e. floor assembly segment 6a, as far as a vehicle rear, i.e. to floor assembly segment 6e. In this illustrative form, floor assembly segments 6a to 6e are produced from one or more different metallic materials, at least some of which are electrically conductive. The ground conductor 3 is designed as a bent and/or stamped part and is adapted geometrically by bending to the shape of floor assembly segments 6a to 6e in such a way that in each case said part rests on said segments by means of that flat side of the part which is at the bottom in FIG. 2.

As indicated purely by way of example here, the ground conductor 3 is fastened to floor assembly segments 6a to 6e by means of a plurality of contact studs 7 of said segments, wherein an electrically conductive or nonconductive sheet-metal retaining strap 8 extending over the ground conductor 3 is provided for this purpose. As an alternative to the sheet metal, a hook and loop tape is also possible. The retaining strap 8 spans the upper flat side of the ground conductor 3 and holds the latter firmly on the body in white in the direction of a vertical axis of said body. In the region of floor assembly segment 6e, the body in white 2 has two comb-shaped grounding elements 9 arranged on the outside in the direction of the width of the body in white 2. The comb-shaped grounding elements 9 are spaced apart from the ground conductor 3 in the direction of the width of the body in white 2 and are electrically connected to the ground conductor 3 by a ground conductor segment 3a extending in the direction of the width, i.e. perpendicularly to the ground conductor 3.

Figure 3:
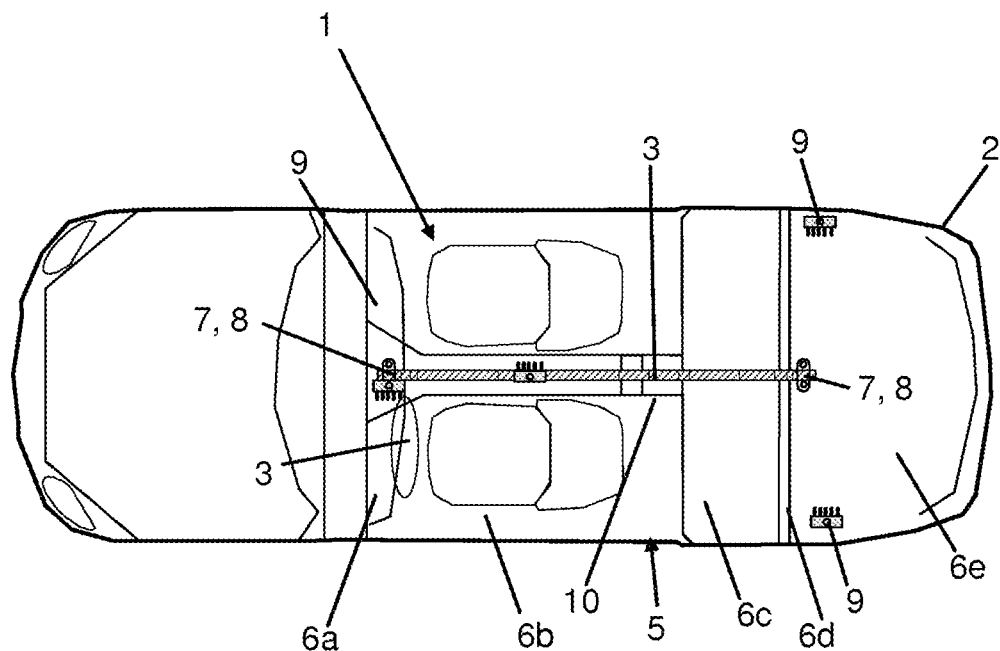
FIG. 3 shows a central arrangement of an individual ground conductor within a vehicle in a plan view according to the present disclosure.

FIG. 3 shows an illustrative arrangement of the ground conductor 3 on the body in white 2 in a plan view. In this case, the ground conductor 3 is arranged centrally with respect to the body in white 2 in the direction of the width of the latter and extends continuously in the longitudinal direction of the body in white 2 from the vehicle front to the vehicle rear, namely from floor assembly segment 6a to floor assembly segment 6e. To make it easier to pass through, the body in white has a ground-conductor receiving depression 10 of a propshaft tunnel or resembling a propshaft tunnel, in which the ground conductor 3 is embedded by insertion. FIG. 3 furthermore illustrates that a comb-shaped grounding element 9, which, by way of example, is connected in an electrically conductive manner to floor assembly segment 6e, can be used to implement a ground return via floor assembly segment 6e to the ground conductor 3, which is likewise connected to floor assembly segment 6e. Thus, it is likewise possible to accomplish a conventional ground return from the loads in this area of the vehicle.

Figure 4:
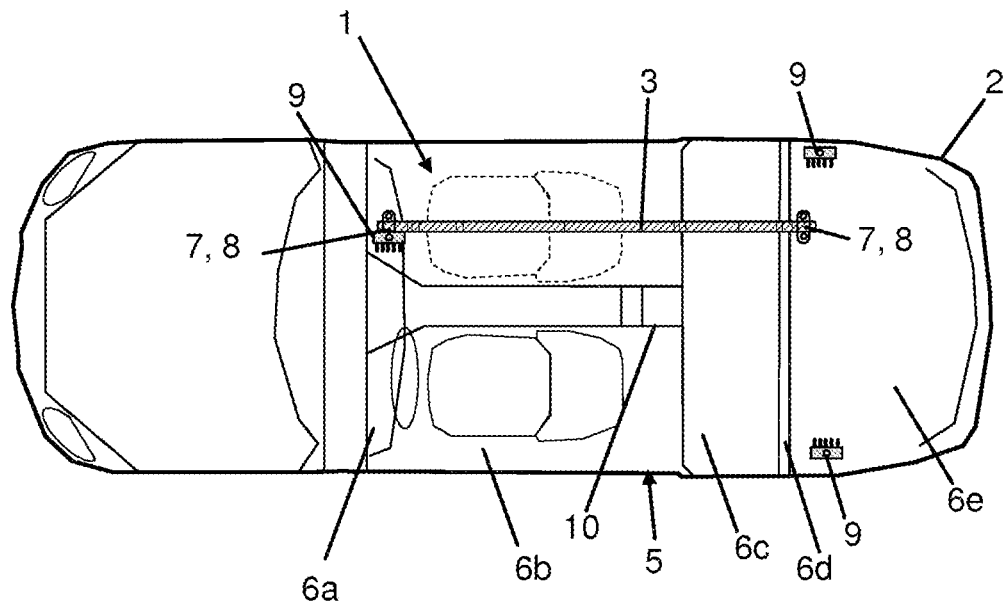
FIG. 4 shows an eccentric arrangement of an individual ground conductor within a vehicle in a plan view according to the present disclosure.

A different arrangement of the ground conductor 3 is shown in a plan view in FIG. 4, the arrangement being eccentric in the direction of the width of the body in white 2. In this case, the ground conductor 3 once again extends continuously in the longitudinal direction of the body in white 2 from the vehicle front to the vehicle rear, although it does so eccentrically in the region of a passenger side of the body in white 2. This arrangement offers the advantage that there is no need to retain any installation space for the ground conductor 3 in the central region of the body in white 2 or of the propshaft tunnel.

Figure 5:
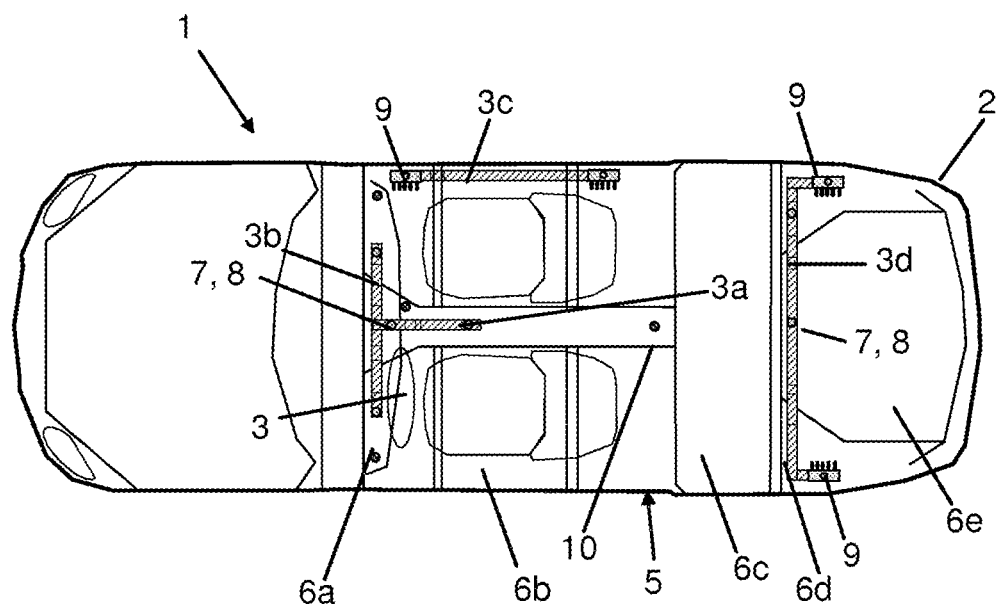
FIG. 5 shows an arrangement of a plurality of ground conductors within a vehicle in a plan view according to the present disclosure.

FIG. 5 shows another arrangement of the ground conductor 3 in a plan view, in this case namely as individual ground conductor segments 3a to 3e extending over floor assembly segments. This variant is expedient especially when some of floor assembly segments 6a to 6e have sufficiently good electrical conductivity, while others do not. In the arrangement illustrated in FIG. 5, the floor assembly segments 6a to 6e which do not have sufficient electrical conductivity are bridged by ground conductor segments 3b to 3e in order to allow a defined ground return toward the vehicle battery in this form of the floor assembly 5 too. In this case, ground conductor segment 3a extends between two floor assembly segments in the longitudinal direction of the body in white 2. Ground conductor segment 3c, which is electrically connected to ground conductor segment 3a, likewise extends between two mutually spaced floor assembly segments in the direction of the width of the body in white 2.

Figure 6:
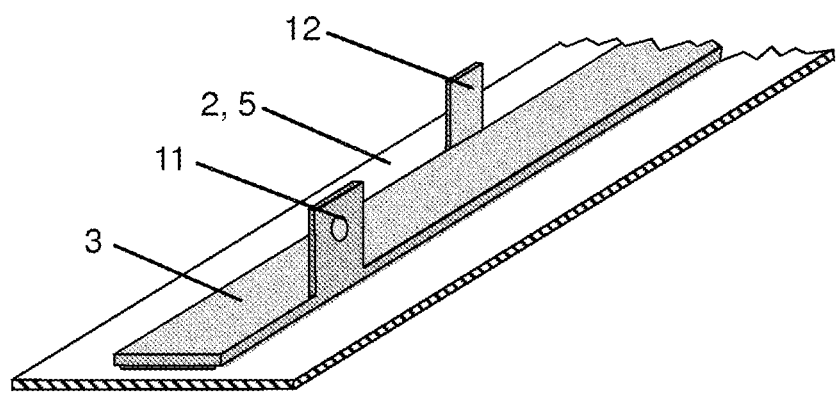
FIG. 6 shows various contacting possibilities for a ground conductor in a partial perspective view according to the present disclosure.

A longitudinal subsection of the ground conductor 3 attached to the body in white 2 is illustrated in a perspective side view in FIG. 6. It can be seen that the ground conductor 3 has a plurality of laterally arranged electrical contact parts, of which a first contact part 11 and a second contact part 12, spaced apart from the latter in the longitudinal direction of the ground conductor 3, are shown here by way of example. Both contact parts 11, 12 project above the upper flat side of the ground conductor 3 while being flush with opposite narrow sides of the ground conductor 3, i.e. extend in the direction of the vertical axis of the vehicle. As a result, the contact parts 11, 12 also form a lateral guide for the supply lines 4 (not shown here for the sake of better illustration). The first contact part 11 is provided as a screw contact, while the second contact part 12 is provided as a plug contact. By means of these contact parts 11, 12, it is likewise possible to connect an electrical load (not shown) electrically to the ground conductor 3, namely either directly, e.g. by means of a soldered or welded joint or the like, or indirectly, e.g. via a ground line.

Figure 7:
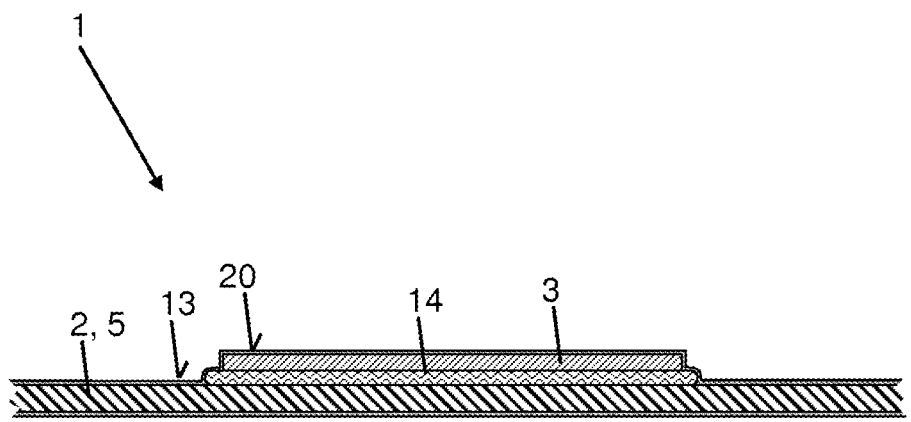
FIG. 7 shows a cross-sectional view of a ground conductor, which is painted with a vehicle paint together with a body component according to the present disclosure.

FIG. 7 shows a possible time sequence for the integration of the ground conductor 3 into the body in white 2 or the floor assembly 5. It can be seen that the ground conductor 3 in this variant has already been fastened to the body in white 2 before the painting of the body in white 2 with a vehicle paint 13. The ground conductor 3 has therefore been covered with the vehicle paint together with the body in white 2. It can furthermore be seen that, purely by way of example here, the ground conductor 3 has been fastened to the body in white 2 by means of an adhesive joint 14.

Figure 8:
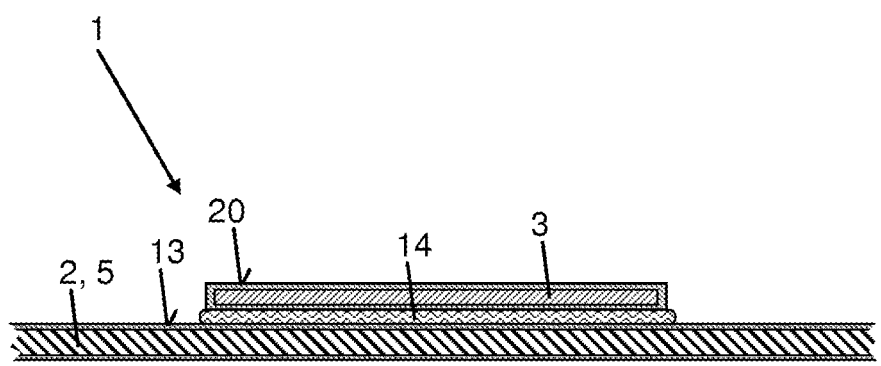
FIG. 8 shows a cross-sectional view of an electrically insulated ground conductor, which is attached to a body component painted with vehicle paint according to the present disclosure.

Another possible time sequence for the integration of the ground conductor 3 into the body in white 2 is illustrated in FIG. 8. In this variant, the ground conductor 3, which is provided with an insulating layer 20, has been attached to the body in white 2 only after the painting of the latter. Accordingly, the ground conductor 3 and the body in white 2 are spatially separated from one another both by the vehicle paint 13 and by the adhesive of the adhesive bond 14.

Figure 9:
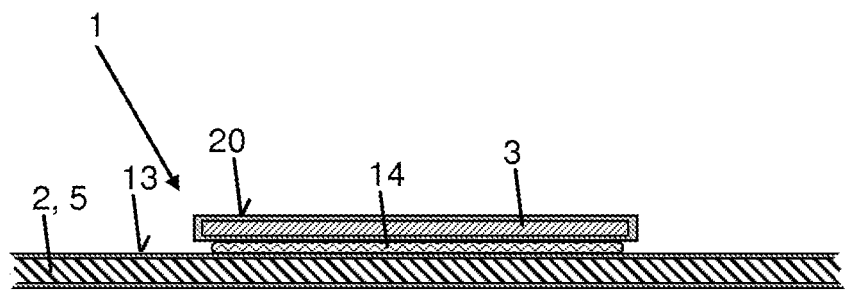
FIG. 9 shows a cross-sectional view of a ground conductor which is adhesively bonded over an extended area to a body component in the direction of the width of a body in white according to the present disclosure.
Figure 10:
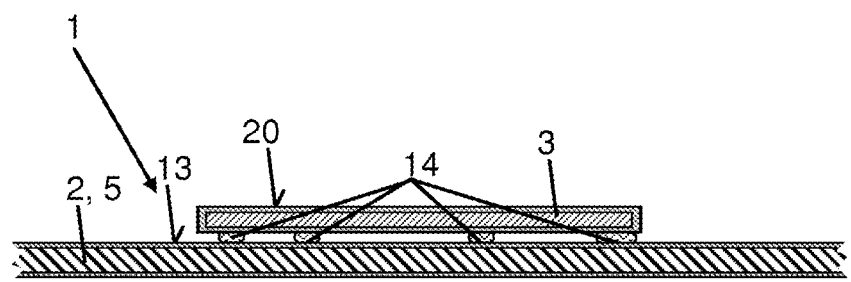
FIG. 10 shows a cross-sectional view of a ground conductor which is adhesively bonded in some section or sections to a body component in the direction of the width of a body in white according to the present disclosure.
Figure 11:
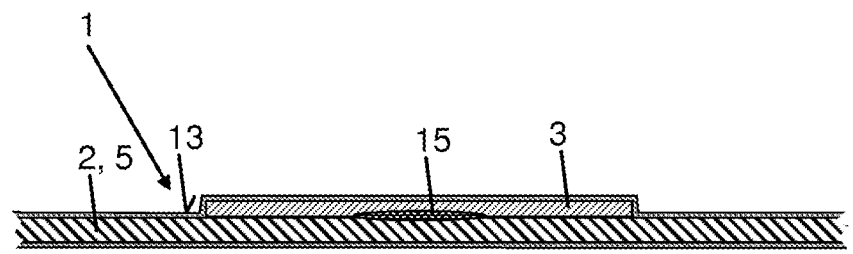
FIG. 11 shows a cross-sectional view of a ground conductor which is welded in some section or sections to a body component in the direction of the width of a body in white according to the present disclosure.

In FIGS. 9 to 11, the body in white 2 and the ground conductor 3 arranged thereon are illustrated in a cross-sectional view. In FIG. 9, the adhesive bond 14 between the body in white 2 and the ground conductor 3 is provided as an extensive adhesive bond 14 which is continuous in the transverse direction of the ground conductor 3. In contrast, the adhesive bond 14 shown in FIG. 10 is formed in sections in the transverse direction of the ground conductor 3, i.e. with a plurality of individual adhesive sections. According to FIG. 11, as an alternative to the adhesive bond 14, the ground conductor 3 is connected to the body in white 2 by means of a welded joint 15.

Figure 12:
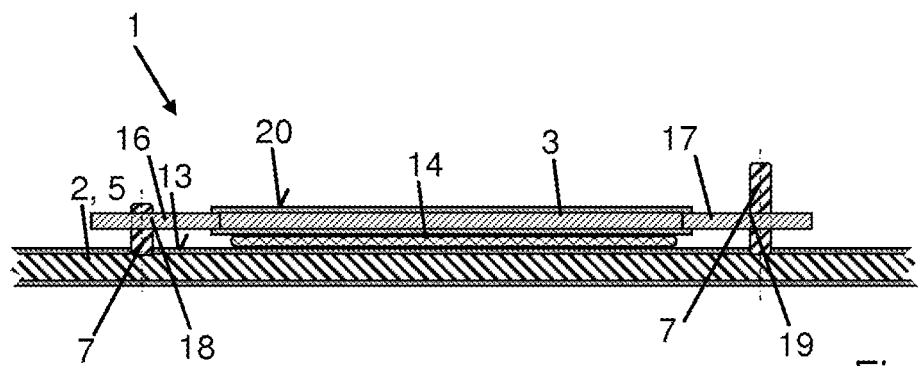
FIG. 12 shows a cross-sectional view of a ground conductor which is connected to a body in white by contact tabs according to the present disclosure.

FIG. 12 shows an example of the floor assembly segments 6a to 6e of the body in white 2 and the ground conductor 3 arranged thereon in a cross-sectional view. For a mechanical and electrical connection between the ground conductor 3 and the floor assembly segments 6a to 6e, the ground conductor 3 has connection tabs 16 and 17, which project laterally over the transverse extent of the ground conductor 3 and each have a through opening 18 and 19, which is in engagement with contact studs 7 of the floor assembly segments 6a to 6e. By means of the connection tabs 16, 17 and the contact studs 7, the floor assembly segments 6a to 6e and the ground conductor 3 are connected electrically to one another. Moreover, the ground conductor 3 is fixed laterally in addition to the adhesive joint 14. It can be seen from FIG. 12 that the contact studs 7 are not covered with the vehicle paint 13 since they have been masked with a plug or the like before painting. It can furthermore be seen in FIG. 12 that an insulation 20 of the ground conductor 3 is formed in the region of its two flat sides but has been omitted from its narrow sides having the connection tabs 16, 17. The contact stud 7 on the right-hand side is therefore raised, in contrast to the contact stud 7 on the left-hand side, to enable a comb-shaped grounding element 9 likewise to be attached here, thus enabling loads to be contacted from here, even using circular ground conductors (stranded conductors).

Figure 13:
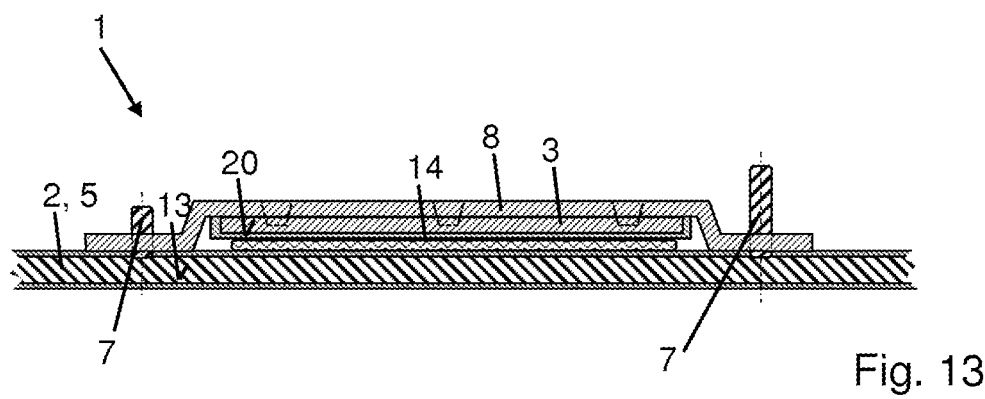
FIG. 13 shows a cross-sectional view of a ground conductor which is connected to a body in white by a contact strap according to the present disclosure.

Another possibility for the mechanical and electrical connection of the ground conductor 3 to the floor assembly segments 6a to 6e is illustrated in FIG. 13. The ground conductor 3 is now connected electrically to the contact studs 7 by means of the abovementioned retaining strap 8, instead of by means of the connection tabs 16, 17. For this purpose, there is a gap in the insulation 20 on the flat side of the ground conductor 3 which is at the top in FIG. 13, wherein the retaining strap 8 rests by means of its lower flat side in FIG. 13 on the upper flat side of the ground conductor 3 and is connected nonpositively, positively or materially. By means of the retaining strap 8, which has an offset shape here, the ground conductor 3 is fixed both laterally and in an upward direction.

Figure 14:
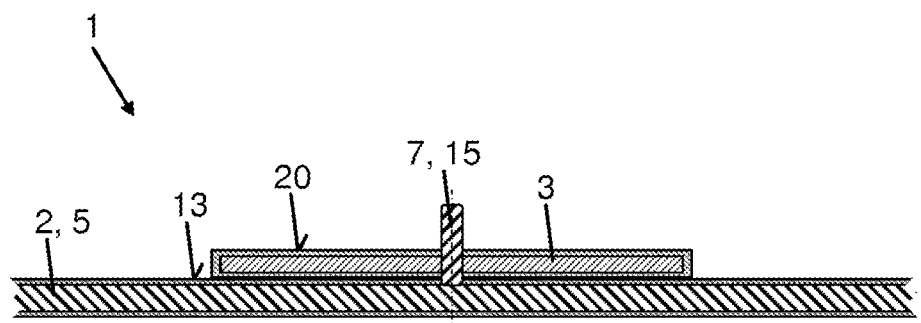
FIG. 14 shows a cross-sectional view of a ground conductor which is connected directly to a body in white by means of a contact stud according to the present disclosure.

In the form shown in a cross-sectional view in FIG. 14, the ground conductor 3 is welded to at least one of the contact studs 7 and is thus likewise connected mechanically and electrically thereto.

Figure 15:
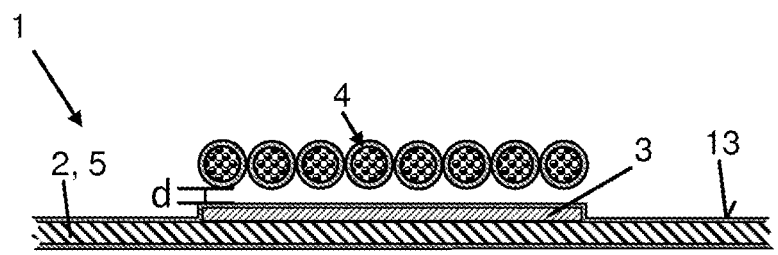
FIG. 15 shows a cross-sectional view of a ground conductor, on the flat side of which a plurality of supply lines is arranged so as to lie next to one another according to the present disclosure.
Figure 16:
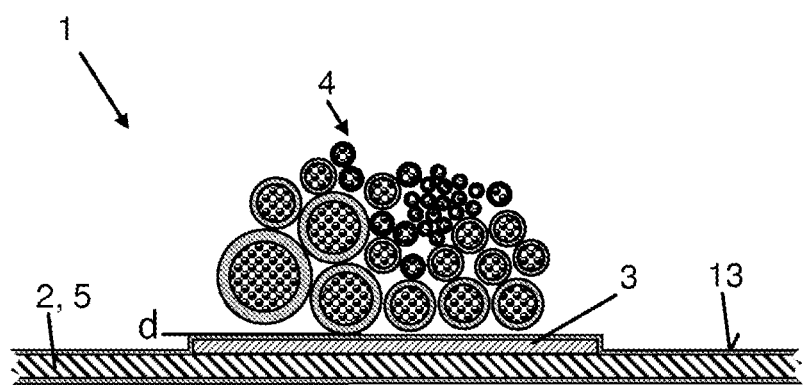
FIG. 16 shows a cross-sectional view of a ground conductor, on the flat side of which a plurality of bundled supply lines with or without signal lines is arranged according to the present disclosure.
Figure 17:
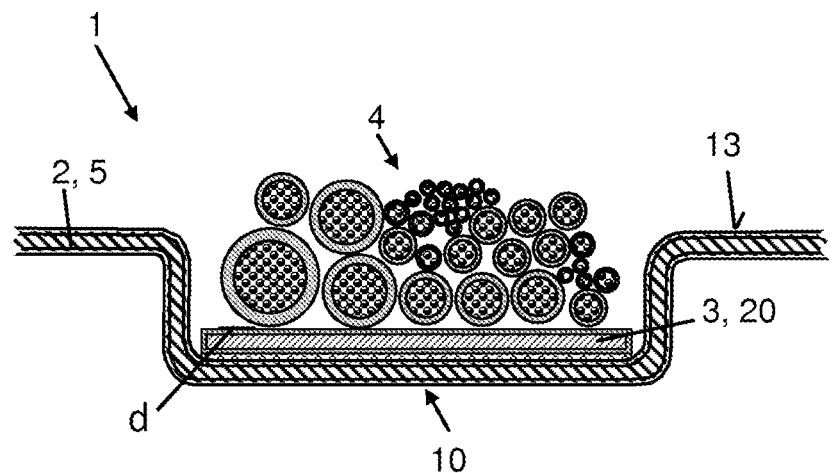
FIG. 17 shows a cross-sectional view of a ground conductor which is arranged in a ground-conductor receiving depression of the body in white and on the flat side of which a plurality of bundled supply lines is arranged according to the present disclosure.

In each of FIGS. 15 to 17, the body in white 2 with the ground conductor 3 attached thereto and the flexible supply lines 4 arranged thereon at a distance d of up to 15 mm are shown in a cross-sectional view. Here, the overlap between the ground conductor 3 and the supply lines 4 is approximately 100% of the transverse extent of the ground conductor 3 or of the supply lines 4. In the variant illustrated in FIG. 15, a plurality of individual lines, provided as flexible stranded conductors, of the supply lines 4 are arranged in a single row next to one another on the upper flat side of the ground conductor 3. In FIG. 16, a plurality of individual lines, provided as flexible stranded conductors, of the supply lines 4 are gathered into a bundle and arranged at a distance d above the flat side of the ground conductor 3. It can be seen that, in some cases, the individual lines have different line cross sections from one another, wherein, for the sake of simplicity, no distinction is made here between the terms "signal" and "supply" lines. FIG. 17 shows the arrangement from FIG. 16, wherein both the ground conductor 3 and the bundled supply lines 4 are here accommodated in the ground-conductor receiving depression 10.

Figure 18:
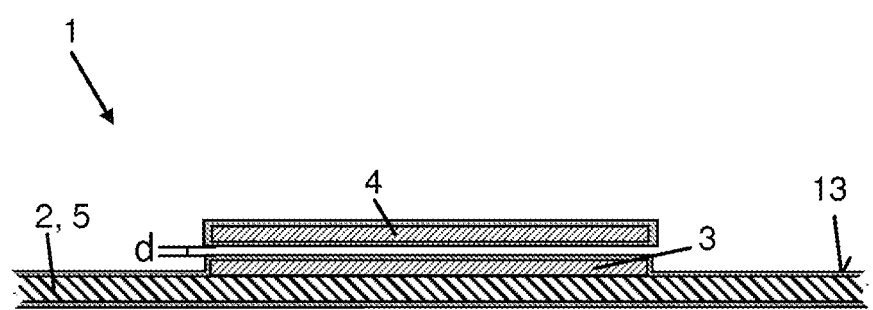
FIG. 18 shows a cross-sectional view of a ground conductor which is painted with a vehicle paint and is arranged parallel to the supply line designed as a flat conductor rail according to the present disclosure.

In FIG. 18, the single supply line 4 illustrated is provided as a dimensionally stable, electrically insulated flat conductor rail and is likewise arranged at a distance d above the ground conductor 3 and routed parallel to the latter. It can be seen that the overlap between the ground conductor 3 and the supply line 4 is approximately 100% of the transverse extent of the supply line 4. It is apparent from FIG. 18 that the ground conductor 3 is here covered with the vehicle paint 13, i.e. is painted at the same time.

Figure 19:
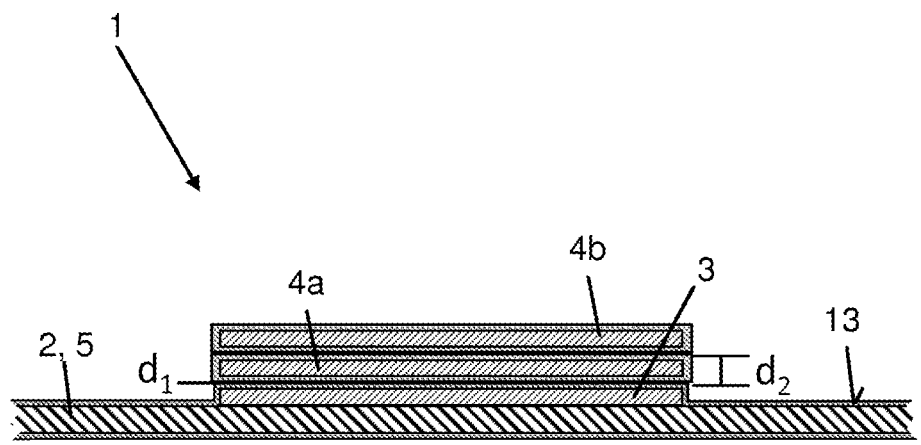
FIG. 19 shows a cross-sectional view of a ground conductor which is painted with a vehicle paint and parallel to which two flat conductor rails decoupled from one another and lying one above the other are arranged as supply lines according to the present disclosure.
Figure 20:
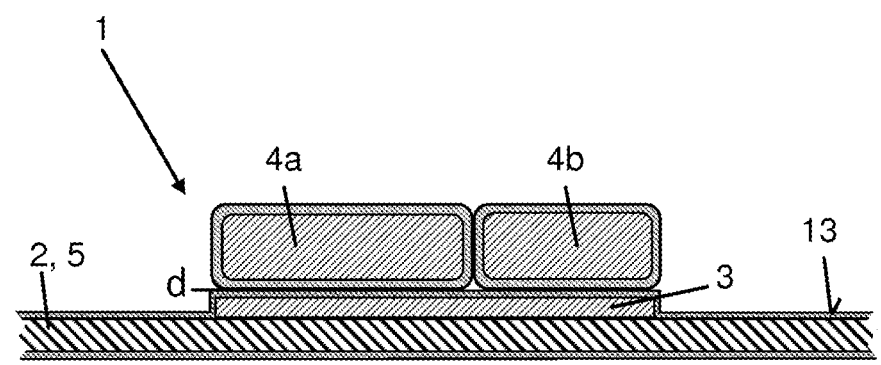
FIG. 20 shows a cross-sectional view of a ground conductor which is painted with a vehicle paint and parallel to which two flat conductor rails decoupled from one another and lying next to one another are arranged as supply lines according to the present disclosure.

FIGS. 19 and 20 show, in a cross-sectional view, another variant form of the supply lines 4, which are arranged at a distance d1 and d2, respectively, above the ground conductor 3. As can be seen in FIG. 19, a first supply line 4a, which is designed as a dimensionally stable and electrically insulated flat conductor rail, and a second supply line 4b, which is likewise designed as a dimensionally stable and electrically insulated flat conductor rail, are arranged one above the other above the ground conductor 3. Here, the first supply line 4a serves for the electrical connection of a starter or generator (not shown) to a battery (not shown) of the vehicle and the second supply line 4b serves for the electrical connection of the positive terminal of the vehicle battery (not shown) to one or more electrical loads of the vehicle. In the variant form shown in FIG. 20, the first supply line 4a and the second supply line 4b are not arranged one above the other but next to one another. Common to both variants in FIGS. 19 and 20 is the fact that there is 100% overlap between the ground conductor 3 and the two supply lines 4a, 4b.

The energy supply system can be produced or provided as follows. On the body in white 2, which is readily accessible from the outside, the ground conductor 3 is first of all attached to the floor assembly 5 of the body in white 2. Depending on the design form of the floor assembly 5, a single ground conductor 3 or a plurality of ground conductors 3 is provided for this purpose. At a later time, namely only after the body in white 2 with the ground conductor 3 or the vehicle produced at least partially therefrom has been provided, the supply lines 4 are laid through the vehicle, as known from the conventional installation of a set of leads. Here, the arrangement of the supply lines 4 relative to the ground conductor is implemented in one or more variant forms, which are explained above.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An electrical energy supply system for a vehicle comprising:

at least one ground conductor provided with a body in white of the vehicle, wherein the at least one ground conductor is a flat conductor rail arranged on a floor assembly of the vehicle and having a flat side; and at least one supply line inserted into the body in white, the at least one supply line comprising another flat conductor rail with a contour substantially matching a contour of the at least one ground conductor and a flat side extending parallel to the flat side of the at least one ground conductor and at least partially overlapping the flat side of the at least one ground conductor, wherein the at least one ground conductor is positioned between the floor assembly of the vehicle and the at least one supply line, the another flat conductor rail is positioned at a predetermined distance from the at least one ground conductor, the predetermined distance being a function of an electromagnetic field resulting from current flowing through the at least one supply line such that an induced current in at least one ground conductor generates another electromagnetic field that at least partially cancels out the electromagnetic field of the supply line.

2. The electrical energy supply system according to claim 1, wherein the predetermined distance between the at least one ground conductor and the at least one supply line is no more than 15 mm.

3. The electrical energy supply system according to claim 1, wherein the at least one ground conductor is fastened to the body in white such that a change in length between the at least one ground conductor and the body in white is compensated.

4. The electrical energy supply system according to claim 1, wherein the at least one ground conductor is arranged substantially centrally along the body in white and extends in a longitudinal direction of the body in white.

5. The electrical energy supply system according to claim 1, wherein the at least one ground conductor is covered by vehicle paint or an underseal.

6. The electrical energy supply system according to claim 1, wherein the at least one ground conductor is a stamped part or a bent part.

7. The electrical energy supply system according to claim 1, wherein the at least one ground conductor has a width which varies along its length.

8. The electrical energy supply system according to claim 1, wherein the at least one ground conductor has a width between about 10 mm to about 60 mm.

9. The electrical energy supply system according to claim 1, wherein the at least one ground conductor has a height between about 0.8 mm to about 5 mm.

10. The electrical energy supply system according to claim 1, wherein the at least one ground conductor has a height between about 1 mm to about 2 mm.

11. The electrical energy supply system according to claim 1, wherein the at least one ground conductor has an insulating layer with a thickness between about 0.15 mm to about 2.5 mm.

12. The electrical energy supply system according to claim 1, wherein the at least one ground conductor has an insulating layer with a thickness between about 0.3 mm to about 1.5 mm.

13. The electrical energy supply system according to claim 1, wherein the at least one supply line comprises at least one first supply line configured for electrical connection of a starter or of a generator to a battery of the vehicle, and at least one second supply line configured for electrical connection of a vehicle battery positive to one or more electrical loads of the vehicle.

14. The electrical energy supply system according to claim 1, wherein the at least one supply line is at least one flexible stranded conductor.

15. The electrical energy supply system according to claim 14, wherein the at least one flexible stranded conductor is a plurality of stranded conductors arranged parallel to one another within a transverse extent of the at least one ground conductor.

16. The electrical energy supply system according to claim 1, wherein the floor assembly is produced at least partially from an electrically conductive metallic material.

17. The electrical energy supply system according to claim 1, wherein the at least one ground conductor further comprises a contact part projecting above the flat side of the flat conductor rail arranged on the floor assembly of the vehicle.

18. The electrical energy supply system according to claim 1, wherein the at least one ground conductor further comprises a first contact part and a second contact part projecting above the flat side of the flat conductor rail arranged on the floor assembly of the vehicle such that the first and second contact parts form a lateral guide for the at least one supply line.

* * * * *